United States Patent

Sato et al.

[11] Patent Number: 5,365,392
[45] Date of Patent: Nov. 15, 1994

[54] MAGNETIC HEAD WITH SHAPED WINDING GROOVES

[75] Inventors: Heikichi Sato; Hitoshi Kimura; Osamu Onodera, all of Miyagi, Japan

[73] Assignee: Sony Corporation, Tokyo, Japan

[21] Appl. No.: 8,672

[22] Filed: Jan. 22, 1993

[30] Foreign Application Priority Data

Jan. 31, 1992 [JP] Japan .................................. 4-016969

[51] Int. Cl.⁵ .......................................... G11B 5/147
[52] U.S. Cl. .................................................. 360/126
[58] Field of Search ...................... 360/126, 125, 123

[56] References Cited

U.S. PATENT DOCUMENTS 5,157,569 10/1992 Kumasaka ........................... 360/126
5,218,500 6/1993 Okuda .................................. 360/126

*Primary Examiner*—A. J. Heinz
*Attorney, Agent, or Firm*—Hill, Steadman & Simpson

[57] ABSTRACT

A magnetic head having a pair of magnetic core halves, at least one of which is formed of a magnetic oxide material portion, a winding groove and a magnetic metal thin film formed on a surface having the winding groove of the magnetic oxide material portion, which are abutted so that a magnetic gap is formed on an abutment surface of the magnetic metal thin film, wherein an entire surface of the winding groove is slanted with angles of 0° to 60° with respect to gap surfaces constituting the magnetic gap.

2 Claims, 4 Drawing Sheets

MAGNETIC HEAD WITH SHAPED WINDING GROOVES

BACKGROUND OF THE INVENTION

1. Field of the Invention

The present invention relates to magnetic heads and, more particularly, is directed to a magnetic head of a parallel gap configuration called a metal-in-gap type magnetic head suitable for recording and reproducing a signal on a magnetic recording medium with a high coercive force in which magnetic core halves are opposed through magnetic metal thin films of a high permeability between which a magnetic gap is sandwiched so that the halves are opposed to the magnetic gap in parallel thereto.

2. Description of the Prior Art

Recently, a wavelength of an information signal recorded by a magnetic recording/reproducing apparatus such as a video tape recorder (VTR) has become shorter so as to improve quality of an image to be recorded. Accordingly, there has been employed a recording medium with a high coercive force such as a metal tape formed by using ferromagnetic metal powder as magnetic powder or an evaporated tape which is formed by directly depositing ferromagnetic metal material on a base film or the like. The metal-in-gap type magnetic head whose magnetic gap of a magnetic core is formed by magnetic metal thin films has been proposed as a magnetic head suitable for use for the magnetic recording medium with a high coercive force.

An example of the conventional metal-in-gap type magnetic heads will be explained with reference to FIG. 1. As shown in FIG. 1, two magnetic core halves 11 and 12 which are fabricated separately are abutted through a magnetic gap g and then integrally combined to thereby form a magnetic head.

In the magnetic core halves 11 and 12, core portions are formed by magnetic oxide material portions 1 and 2 made of a material such as a single crystal ferrite or the like, respectively. The magnetic oxide material portions 1 and 2 are deposited, with magnetic metal thin films 3 and 4 made of a material such as FeAlSi alloy, FeGaSiRu alloy or the like having a high saturation magnetic flux density, on opposite surfaces thereof each extending from a front side forming an opposing surface 7 opposing to a magnetic recording medium to a back side 17 thereof.

The thus prepared magnetic core halves 11 and 12 are opposed such that the magnetic metal thin films 3 and 4 thereof are opposed each other and then abutted through a gap spacer (not shown) to thereby form the magnetic gap g therebetween. Track width defining or confining grooves 9 are formed at both sides of the magnetic gap g, for example, so that the grooves 9 define a track width Tw of the magnetic gap g.

The track width defining grooves 9 are formed in the magnetic oxide material portions 1 and 2 so as to communicate from the front side, that is, the opposing surface 7 to the back side 17. Fusing glass 8 fused in a fusion furnace or the like is filled in the grooves 9 to thereby couple the magnetic core halves 11 and 12.

Then, a coil is wound in a winding groove 5 provided at an intermediate portion between a front portion and a back portion of each of the magnetic oxide material portions 1 and 2. Thus, the magnetic core halves 11 and 12 are opposed through the magnetic metal thin films 3 and 4 with high permeability between which the magnetic gap g is sandwiched so that the halves 11 and 12 are opposed to the magnetic gap g in parallel thereto. Namely, abutment surfaces of the magnetic metal thin films 3 and 4, that is, a gap surface 10 is provided in parallel to interfaces 1S and 2S between the magnetic metal thin films 3, 4 and the magnetic oxide material portions 1, 2 at the front portion, thereby a ring type magnetic head of a parallel gap configuration is provided.

According to the thus constituted conventional magnetic head, portions extending substantially vertically to the gap surface 10, that is, vertical surfaces 5a are provided at parts of the track width defining grooves 9 and the winding grooves 5. Thus, in a case of forming the magnetic metal thin films 3 and 4 on these grooves 5 and 9 by the deposition, the sputtering process or the like, these thin films are not sufficiently grown on the vertical surfaces 5a since molecules or particles of the film material are prevented from flowing or being impinged on the vertical surfaces due to upper edge portions of the vertical surfaces 5a. Further, columnar crystal structure of the thus formed thin films becomes rough and so density of the thin films substantially vary on the vertical surfaces, so that the thin films may be formed as insufficient films. Furthermore, a thickness of the thin films only on the vertical surfaces 5 may be less than a half of those of other portions thereof and so on. Accordingly, it has been difficult to form the magnetic metal thin films 3 and 4 on all the inner surfaces of the grooves 5 and 9 with uniform and good film characteristics such as a high permeability and a low coercive force.

Thus, in the thus constituted magnetic head, magnetic fluxes generated in a recording or a reproducing mode can not flow through the magnetic metal thin films 3 and 4 on the vertical surfaces 5a but flow in the magnetic oxide material portions 1 and 2 at the area on the vertical surfaces 5a then flow in the magnetic metal thin films 3 and 4 at the area on other surfaces of the grooves. Therefore, even if the magnetic metal thin films 3 and 4 with a high permeability are deposited, the magnetic metal thin films 3 and 4 can not make an entire permeability thereof larger than that of the magnetic oxide material portions 1 and 2 but can improve only the saturation magnetic flux density, so that the thus constituted conventional magnetic head of the parallel gap configuration has the disadvantage that the electromagnetic-conversion characteristic thereof can not be improved.

Further, as a magnetic head of the metal-in-gap structure in which a magnetic metal thin film with a high permeability constitutes a main path for magnetic fluxes, there has been proposed a magnetic head called a laminated type magnetic head in which the magnetic metal thin films are laminated so that each film is sandwiched by guard material such as magnetic ferrite in a track width direction. The laminated type magnetic head has the disadvantages such that productivity of the head may be degraded since manufacturing processes thereof are relatively long and that defects are likely produced at a high rate in manufacturing procedure thereof to thereby degrade yield.

Further, since the magnetic metal thin film utilized in the metal-in-gap type head is required to have a thickness substantially same as the track width, the formation of the thin film is very difficult when manufacturing a head with a relatively large track width since the conventional magnetic head of the parallel gap type has the vertical surfaces 5a.

OBJECTS AND SUMMARY OF THE INVENTION

Therefore, it is an object of the present invention to provide an improved magnetic head in which the aforementioned shortcomings and disadvantages encountered with the prior art can be eliminated.

More specifically, it is an object of the present invention to provide a magnetic head of the parallel gap configuration in which magnetic metal thin films with uniform and good film characteristics can be formed in track width defining grooves and winding grooves thereof.

As an aspect of the present invention, a magnetic head having a pair of magnetic core halves, at least one of which is formed of a magnetic oxide material portion, a winding groove and a magnetic metal thin film formed on a surface having the winding groove of the magnetic oxide portion, which are abutted so that a magnetic gap is formed on an abutment surface of the magnetic metal thin film, wherein an entire surface of the winding groove is slanted with angles of 0° to 60° with respect to a gap surface constituting the magnetic gap.

As another aspect of the present invention, a magnetic head having a pair of magnetic core halves, at least one of which is formed of a magnetic oxide material portion, a winding groove, a track width defining groove and a magnetic metal thin film formed on a surface having the winding groove of the magnetic oxide portion, which are abutted so that a magnetic gap is formed on an abutment surface of the magnetic metal thin film, wherein an entire surface of the winding groove and the track width defining groove are slanted with angles of 0° to 60° with respect to gap surfaces constituting the magnetic gap.

According to the magnetic head of the present invention, since the entire surface of the winding groove or the entire surfaces of both the winding groove and the track width defining groove are slanted with angles of 0° to 60° with respect to the abutment surfaces, that is, the gap surfaces of the magnetic metal thin films, the entire surfaces of the magnetic metal thin films which are formed by the deposition or sputtering process can be configured with angles of 0° to 60° with respect to the direction perpendicular to the film growing direction.

That is, in the general film forming process of the magnetic metal thin film, the gap surface is disposed normal to the main deposition direction or the main sputtering direction of the film. Thus, according to the magnetic head of the present invention, the entire surface of the winding groove or the entire surfaces of both the winding groove and the track width defining groove are formed with angles of 0° to 60° with respect to the direction perpendicular to the film growing direction.

It has been known that the magnetic thin film is formed with a uniform thickness and good magnetic characteristics when the magnetic metal thin films are formed with an angle less than 60° with respect to the direction perpendicular to the film growing direction. Therefore, according to the magnetic head of the present invention, it is possible to eliminate the conventional drawback such that the thin films are not sufficiently grown on the grooves since molecules or particles are prevented from flowing or being impinged on the grooves upon the deposition or sputtering process. Further, columnar crystal structure of the thus formed thin films becomes fine and so variations of density of the thin films can be suppressed, so that the magnetic metal thin films can be formed surely with a high permeability and a low coercive force.

The preceding and other objects, features, and advantages of the present invention will become apparent from the following detailed description of illustrative embodiments thereof when read in conjunction with the accompanying drawings, in which like reference numerals are used to identify the same or similar parts in the several views.

DETAILED DESCRIPTION OF THE PREFERRED EMBODIMENTS

The structure of a magnetic head according to the first embodiment of the present invention will hereinafter be described with reference to FIG. 2 and FIGS. 3 to 6 illustrating a manufacturing method thereof. The magnetic head according to the present invention is applicable to video heads for various VTRs, that is, VTRs for business use or VTRs for customer use such as a Betamax system, a VHS system and a 8-mm system, and also applicable to heads for various magnetic discs such as a floppy disc, a hard disc or the like. In particular, the magnetic head according to the present invention is most suitable for magnetic heads for recording a signal at a high recording density.

Figure 1:
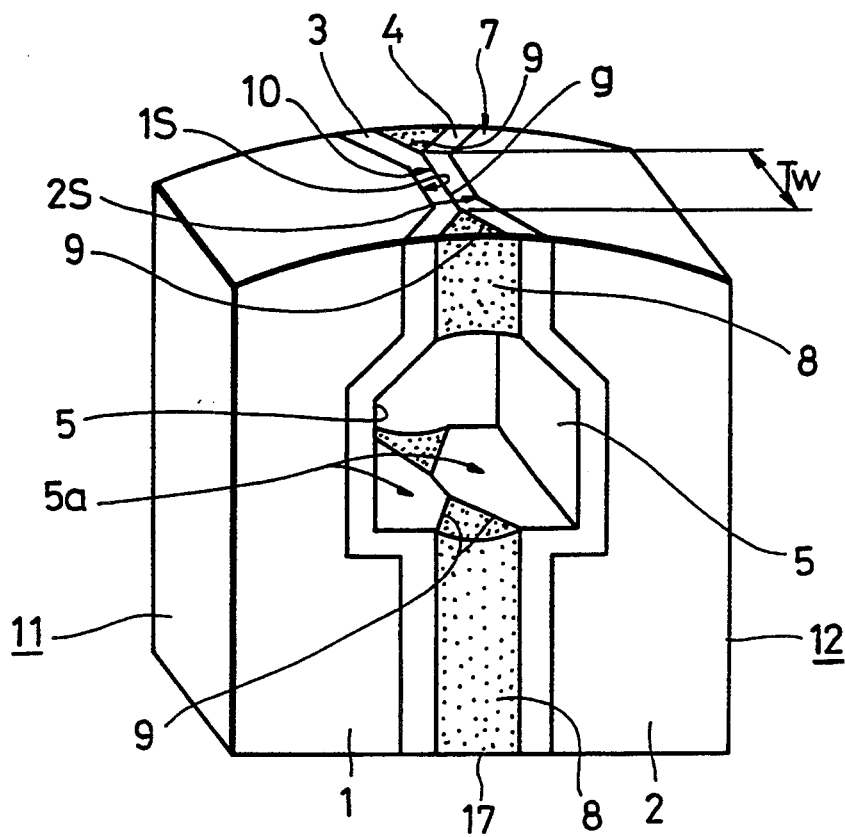
FIG. 1 is a schematic perspective view illustrating an example of conventional magnetic heads in an enlarged scale.
Figure 2:
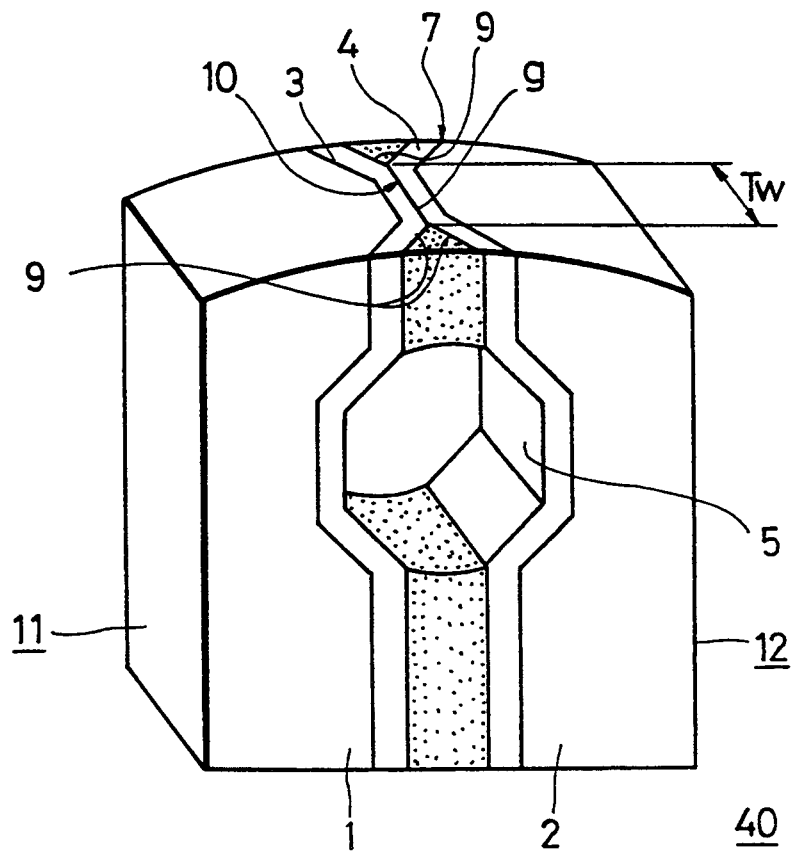
FIG. 2 is a schematic perspective view illustrating a magnetic head according to a first embodiment of the present invention in an enlarged scale.

In the embodiments described below, the present invention is applied to a video magnetic head for a VTR, for example. Referring to FIG. 2 which illustrates a magnetic head according to the first embodiment, a pair of magnetic core halves 11 and 12 which are prepared separately are abutted through a magnetic gap g and then coupled integral to thereby form the magnetic head. In this embodiment, magnetic oxide material portions 1 and 2 formed by single crystal ferrite or the like constitute auxiliary core portions of the magnetic core halves 11 and 12, respectively, and the entire inner surfaces of winding grooves 5 or the entire inner surfaces of both the winding grooves 5 and track width defining or confining grooves 9 are constituted so as to be ductile processing surfaces inclined with angles of 0° to 60° for example, 0° and 45° with respect to abutment surfaces, that is, gap surfaces 10 of the magnetic oxide material portions 1 and 2.

Figure 3:
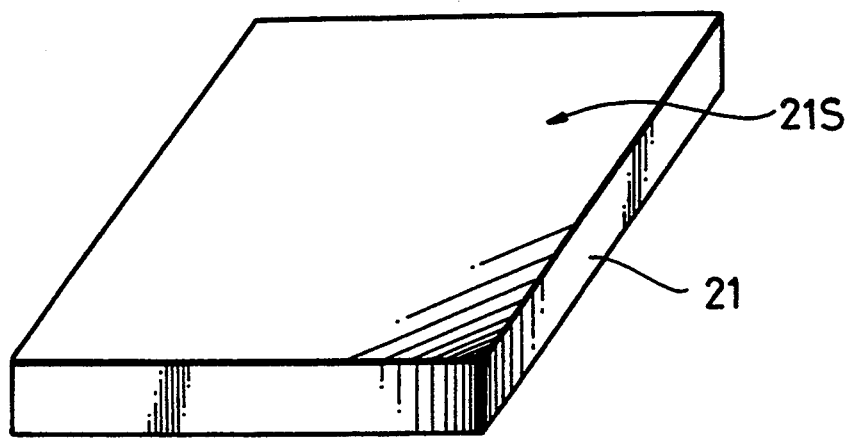
FIG. 3 is a schematic perspective view illustrating a magnetic substrate used to explain a manufacturing method of the magnetic head of the first embodiment.
Figure 4:
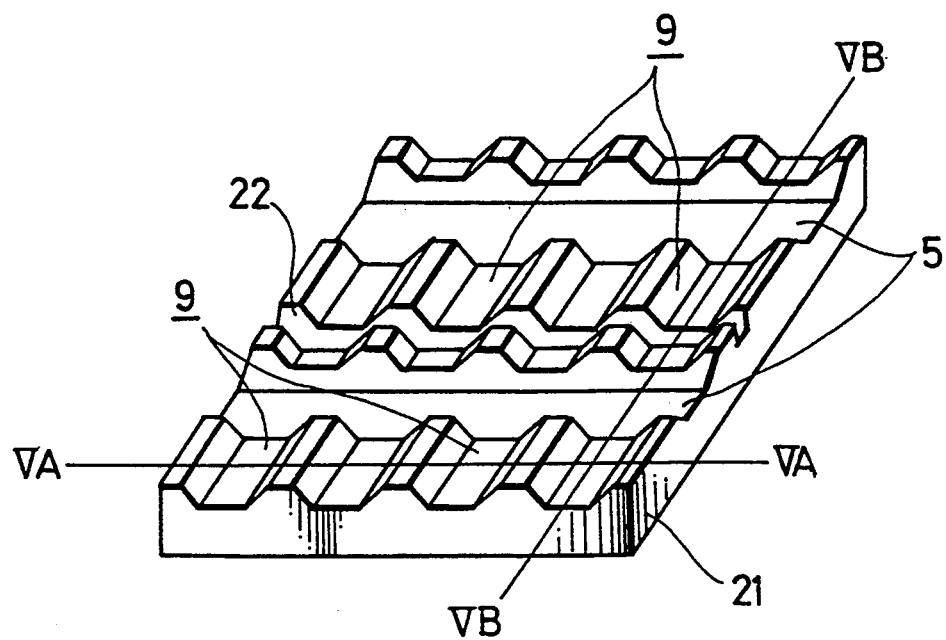
FIG. 4 is a schematic perspective view illustrating a processed magnetic substrate used to explain the manufacturing method of the magnetic head of the first embodiment.

Manufacturing method of the thus constituted magnetic head will be explained with reference to FIGS. 3 to 6. Firstly, a magnetic substrate 21 made of a magnetic single crystal ferrite or the like shown in FIG. 3 is prepared. Then, as shown in FIG. 4, the track width defining grooves 9 are formed on a surface 21S of a {100} crystal plane orientation, for example, of the magnetic substrate 21, and thereafter the substrate 21 with the grooves 9 is partially removed along lines crossing the grooves 9 by a cutting process or the like to form the winding grooves 5. In FIG. 4, a reference numeral 22 represents a cutting groove for separating the magnetic substrate 21.

Figure 5A:
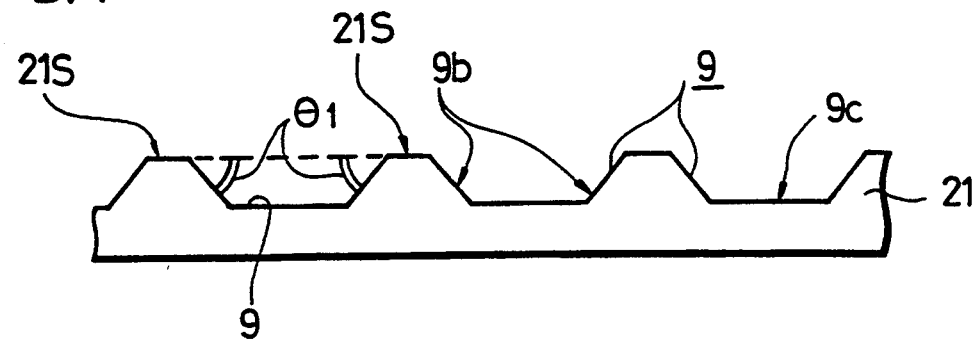
FIGS. 5A and 5B are schematic enlarged sectional views of the processed magnetic substrate taken along lines VA—VA and VB—VB in FIG. 4, respectively.
Figure 5B:
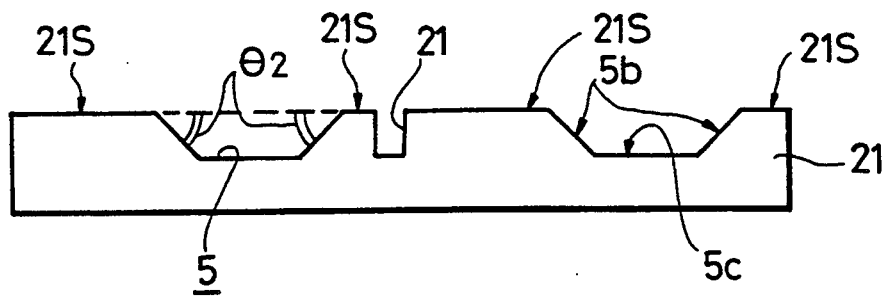

FIGS. 5A and 5B are sectional views of the thus processed magnetic substrate 21 taken along lines VA—VA and VB—VB in FIG. 4, respectively. As shown in FIG. 5A, slanted surfaces 9b of each of the track width defining grooves 9 are formed so as to be slanted with an angle $\theta 1$ of 0° to 60°, for example, 45° with respect to the major surface 21S which will serve as the gap surface 10. Further, a bottom surface 9c of each of the grooves 9 is formed so as to be in parallel to the gap surface 10, that is, to form an angle of 0° with respect to the gap surface 10 by the polishing process using a grindstone or the like. Similarly, as shown in FIG. 5B, slanted surfaces 5b of each of the winding grooves 5 are formed so as to be slanted with an angle $\theta 2$ of 0° to 60° for example, 45° with respect to the major surface 21S. Further, a bottom surface 5c of each of the grooves 5 is formed so as to be in parallel to the gap surface 10, that is, to form an angle of 0° with respect to the gap surface 10 by the polishing process using a grindstone or the like. In this case, the surfaces of these grooves preferably form ductile processing surfaces with roughness almost within a range of 5 nm to 100 nm.

The entire surface of the major surface 21S including the gap surfaces 10 is polished or planished by the lapping process, calender process or the like so as to have a maximum roughness of about 3 nm. Then, a magnetic metal thin film (not shown) of metal material with a high permeability such as Sendust, FeGaSiRu alloy, amorphous alloy or the like, for example, FeGaSiRu alloy is formed on the entire surface of the substrate 21 including the surfaces of the respective grooves 5 and 9 by the deposition or sputtering process or the like so as to have a thickness of 2 to 10 $\mu$m, for example, 6 $\mu$m.

In this case, in each of the grooves 5 and 9, the metal material forming the thin film is impinged in directions of 45° and 90° with respect to the slant surfaces 5b and 9b and the bottom surfaces 5c and 9c, respectively. Thus, the thin film grows in directions of 0° to 60° in this case 0° and 45° from the direction perpendicular to the surface of the thin film, so that it has become possible to form magnetic metal thin films 3 and 4 with a uniform thickness and good film characteristics without varying the density thereof on the entire surface of these grooves.

Figure 6:
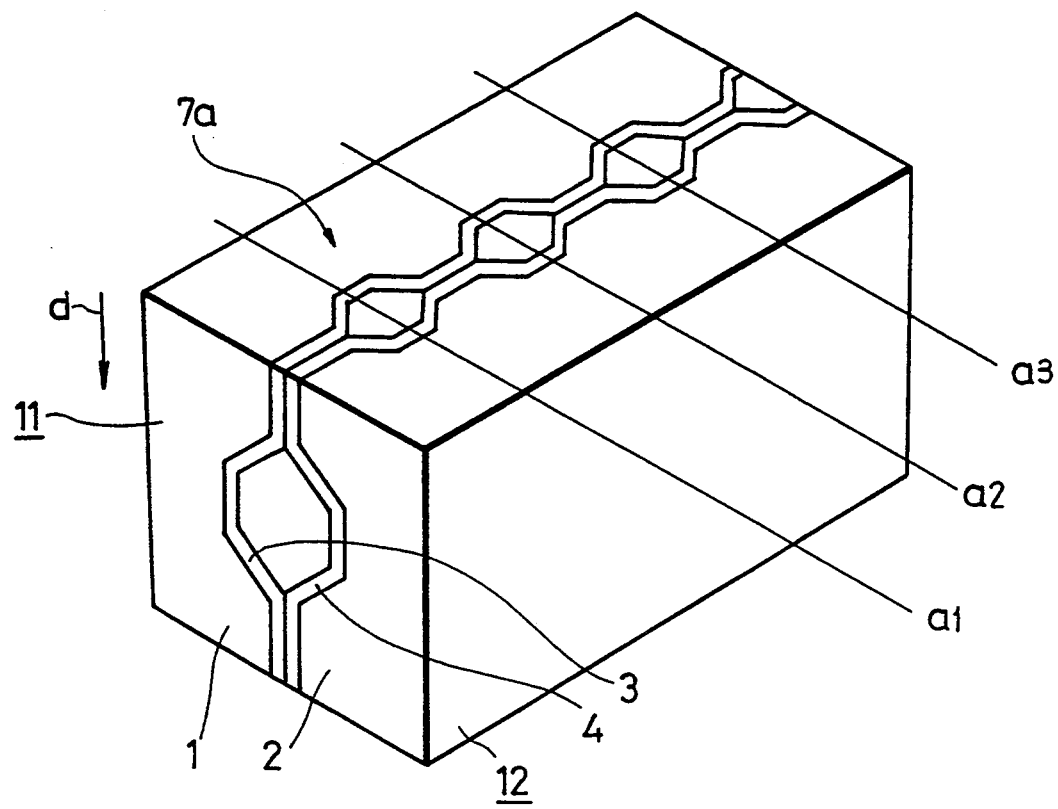
FIG. 6 is a schematic perspective view illustrating magnetic core halves used to explain the manufacturing method of the magnetic head of the first embodiment.

Then, the magnetic substrate 21 is cut along the cutting groove 22 to thereby form the magnetic core halves. Thereafter, as shown in FIG. 6, a pair of the magnetic core halves 11 and 12 are abutted in such a manner that the magnetic metal thin films 3 and 4 thereof are opposed each other. The gap surfaces 10 of the respective halves which both sides are defined by the track width defining grooves 9 are aligned in position, and the magnetic core halves 11 and 12 are laminated by fusing glass 8 or the like through a gap spacer such as SiO$_2$ (not shown). In this example, a thickness of the gap spacer is selected to be 0.2 $\mu$m.

Then, top surfaces 7a of the respective halves constituting opposing surfaces 7 which will oppose to a magnetic recording medium are subjected to the abrasive processing so as to form a curved surface. In this example, a direction d in FIG. 6 is the <011> crystal axis direction for example, of the single crystal ferrite. Thereafter, the laminated magnetic core halves 11 and 12 are cut at every track width defining grooves 9 along lines a1, a2, a3, ... in FIG. 6, thereby the magnetic head of the first embodiment shown in FIG. 2 at reference numeral 40 is obtained. As shown in FIG. 2, the gap surfaces 10 constituting the magnetic gap g are configured so as to have a predetermined track width Tw by the track width defining grooves 9.

According to the thus constituted magnetic head 40 of the first embodiment, since the magnetic metal thin films 3 and 4 with a uniform thickness and good film characteristics are formed on the entire surfaces of the winding grooves 5 and the track width defining grooves 9, magnetic fluxes surely flow within the magnetic metal thin films 3 and 4 with a high permeability and a low coercive force upon recording or reproducing the magnetic recording medium by the magnetic head 40, so that a high reproducing output can be obtained from the head. It has been found by experiment that the reproducing output of the magnetic head 40 having the slant surfaces 5b and 9b of 45° is larger by 1 dB when compared with that of the conventional magnetic head.

Figure 7:
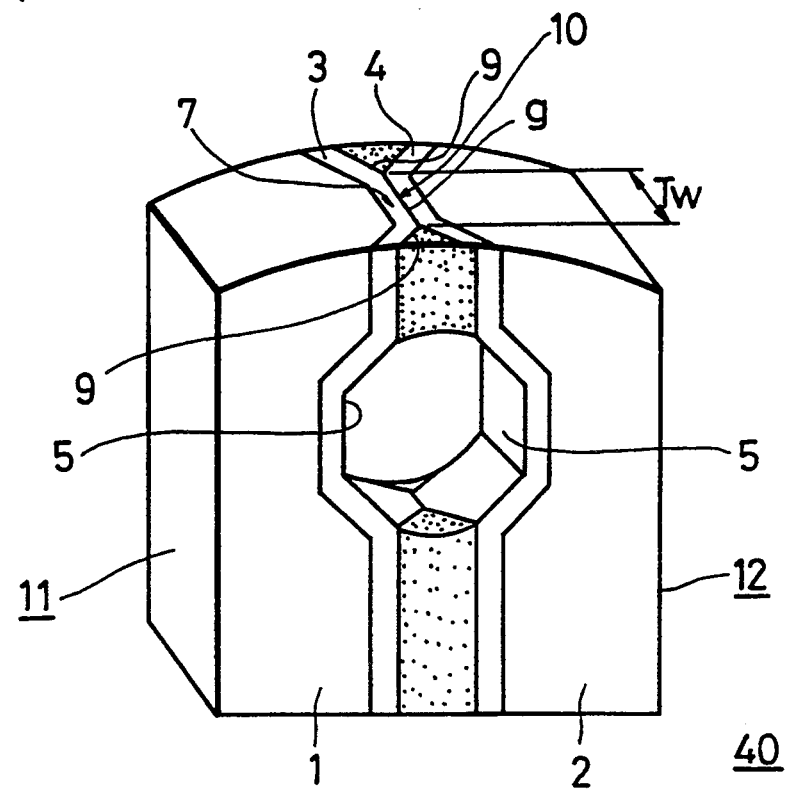
FIG. 7 is a schematic perspective view illustrating a magnetic head according to a second embodiment of the present invention in an enlarged scale.

FIG. 7 shows a magnetic head 40 according to the second embodiment. In this embodiment, the winding groove 5 may not be provided in the magnetic core half 12 but may be provided only in the magnetic core half 11 in a manner that the entire surface of the winding groove 5 is configured to be inclined with angles of 0° to 60° with respect to the gap surface 10. In this case, like the first embodiment, since the magnetic thin films 3 and 4 are formed with a uniform thickness and good film characteristics, the magnetic metal thin films 3 and 4 can be made to have a high permeability and a low coercive force, so that a recording/reproducing output of the second embodiment of the magnetic head can be increased.

Figure 8:
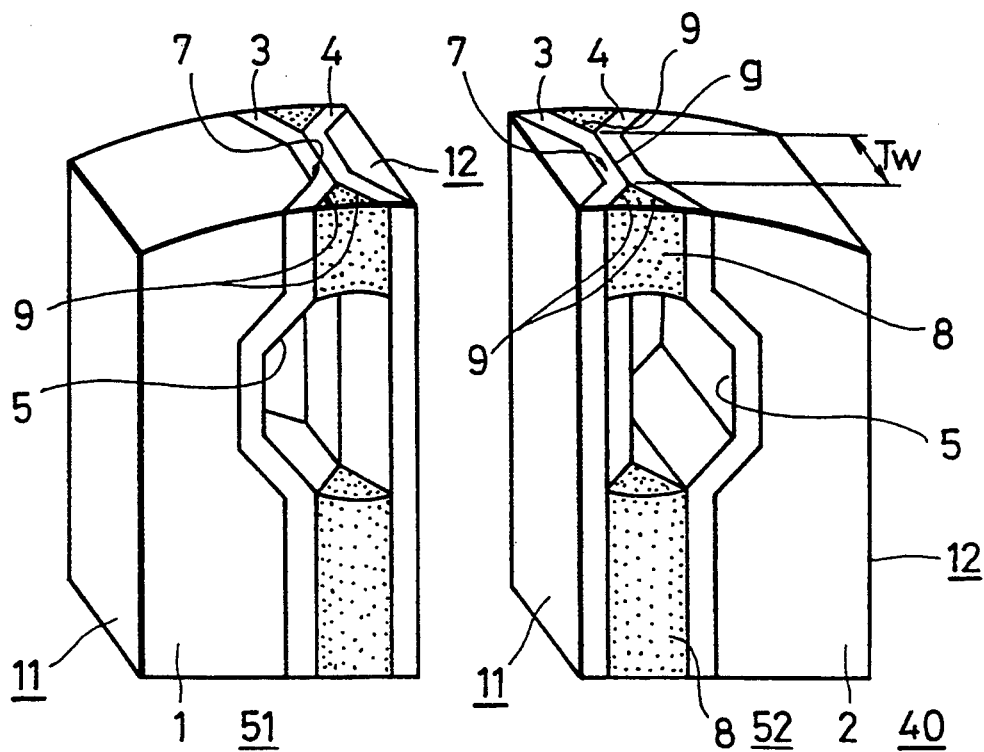
FIG. 8 is a schematic perspective view illustrating a magnetic head according to a third embodiment of the present invention in an enlarged scale.

FIG. 8 shows a magnetic head according to the third embodiment. In this embodiment, the winding groove 5 is not provided only in one of the magnetic core halves 11 and 12, the magnetic oxide material portion 1 or 2 of the other of the magnetic core halves 11 or 12 having no winding groove is configured to have a small thickness, and then these magnetic core halves are integrated to constitute magnetic heads 51 and 52. Then, these magnetic heads 51 and 52 are fixed to a rotary drum, for example, of the magnetic head apparatus so that the gap surfaces 10 of these magnetic heads form a suitable angle therebetween in order that the magnetic gaps of these magnetic heads form a predetermined slant angle so called an azimuth angle therebetween on adjacent tracks of the magnetic recording medium. In this case, like the first embodiment, since the magnetic thin films 3 and 4 of each of the magnetic heads 51 and 52 are formed with a uniform thickness and good film characteristics, the magnetic metal thin films 3 and 4 can be made to have a high permeability and a low coercive force, so that recording/reproducing outputs of the magnetic heads can be increased.

The magnetic head of the present invention is also applicable to magnetic heads configured by other materials.

As set out above, according to the present invention, since the entire surface of the winding grooves 5 or the entire surfaces of both the winding grooves 5 and the track width defining grooves 9 are formed with angles of 0° to 60° with respect to the gap surfaces 10, in a case of forming the magnetic metal thin films 3 and 4 on these grooves 5 and 9 by the deposition or the sputtering process, the thin films can be formed with a uniform thickness, uniform density and good film characteristics on the entire surfaces of these grooves. Thus, the magnetic metal thin films 3 and 4 can be formed with a high permeability and a low coercive force on the entire opposed surfaces of the magnetic core halves 11 and 12, so that magnetic fluxes can surely flow within the magnetic metal thin films 3 and 4, thereby a recording/reproducing output of the magnetic head can be increased.

The magnetic head according to the present invention is advantageous when compared with the magnetic head of the metal-in-gap or lamination structure in that manufacturing processes thereof is smaller and the magnetic head can be manufactured by simplified processes and so the magnetic-conversion characteristic thereof can be improved without degrading productivity and yield thereof.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A magnetic head having a pair of magnetic core halve, at least one of which is formed of a magnetic oxide material portion, and a magnetic metal thin film on each of said core halves, said magnetic metal thin films being abutted so that a magnetic gap is formed between abutment surfaces of the magnetic metal thin films, said gap defining a plane between the abutment surfaces, at least one of said magnetic core halves having a winding groove, wherein said winding groove is bounded by a plurality of planar surfaces formed in the two core halves, there being at least three of said planar surfaces which lie at oblique angles to said gap plane.

2. A magnetic head having a pair of magnetic core halves, at least one of which is formed of a magnetic oxide material portion, and a magnetic metal thin film on each of said core halves, said magnetic metal thin films being abutted so that a magnetic gap is formed between abutment surfaces of the magnetic metal thin films, said gap defining a plane between the abutment surfaces, at least one of said magnetic core halves having a winding groove and at least one of said magnetic core halves having a track width defining groove, wherein said winding groove is bounded by a plurality of planar surfaces formed in the two core halves, there being at least three of said planar surfaces which lie at oblique angles to said gap plane.

* * * * *